United States Patent [19]

Kaneko et al.

[11] 3,928,662
[45] Dec. 23, 1975

[54] PROCESS FOR THE PRODUCTION OF METAL CONTAINING CERAMICS

[75] Inventors: Yasuhisa Kaneko, Toyota; Yoshiro Komiyama, Okazaki; Katsumi Kondo; Fumiyoshi Noda, both of Toyota; Kunihiko Uchida, Okazaki, all of Japan

[73] Assignee: Toyota Jidosha Kogyo Kabushiki Kaisha, Toyota, Japan

[22] Filed: Jan. 21, 1974

[21] Appl. No.: 435,159

[30] Foreign Application Priority Data
Jan. 24, 1973    Japan.............................. 48-010108

[52] U.S. Cl. ................ 427/294; 427/331; 427/370; 427/431; 164/98
[51] Int. Cl.²..................... C23C 1/00; C03C 17/06
[58] Field of Search ........ 117/114 R, 114 C, 160 R, 117/169 R, 65.2; 164/98

[56] References Cited
UNITED STATES PATENTS 3,102,044  8/1963  Joseph .............................. 427/294
3,369,924  2/1968  Duggins et al. ..................... 427/294
3,824,113  7/1974  Loxley ............................... 427/431

*Primary Examiner*—Mayer Weinblate
*Assistant Examiner*—Edith R. Buffalow
*Attorney, Agent, or Firm*—Brisebois & Kruger

[57]    ABSTRACT

Method of manufacturing metal-impregnated ceramic article which consists of a porous, ceramic carbon-containing body impregnated with metal. A sintered ceramic body is sealed up in a vacuum capsule and then impregnated with metal by one of the following three steps:
i. The capsule is submerged in a molten metal, the capsule and molten metal are cast in a mold; and said capsule is broken by applying pressure.
ii. The capsule is positioned in a mold, into which a molten metal is poured; and then pressure is applied to break said capsule.
iii. The capsule is submerged in a molten metal and broken therein by mechanical means. The molten metal together with the sintered ceramic body is then cast in a mold and pressure applied thereto.

6 Claims, 2 Drawing Figures

PROCESS FOR THE PRODUCTION OF METAL CONTAINING CERAMICS

BACKGROUND OF THE INVENTION

For the purpose of impregnating a sintered ceramic body with metal, the so-called autoclave process is conventionally available, whereby the metal for impregnation is melted in a high pressure vessel. The porous ceramic body is then placed in said high pressure vessel and, after evacuation of the high pressure vessel, the porous ceramic body is submerged in the molten metal. Nitrogen or argon gas pressure is then applied to said high pressure vessel to impregnate the porous ceramic body with said metal. According to this process, however, the rate of metal impregnation (i.e., the rate at which the metal fills the pores) and the quality of product obtained, as well as the mass productivity, are limited, because there is a risk that the high pressure vessel will burst. Furthermore, on account of the tremendous installation cost needed to apply a high pressure in the range of 1000 – 2000 kg/cm$^2$ at 800° – 1000°C the pressure applied is usually set at about 100 kg/cm$^2$.

A different process is described in Japanese Patent Application No. 47-484, in which, instead of compression molding of the ceramic powder before hand, the powder and molten metal are directly compressiom-molded for impregnation.

SUMMARY OF THE INVENTION

The object of the present invention is to provide a process of manufacturing a metal-impregnated ceramic, whereby a ceramic article can be impregnated with a metal having a high melting point quite safely under high pressure.

In the drawings:

FIG. 1 is an oblique view of a vacuum capsule in which a ceramic sintered body for the process according to the present invention is sealed up; and FIG. 2 is a diagram illustrating the relationship between the applied pressure and the rate of metal impregnation.

In these figures, reference numeral 1 indicates the capsule and 2 indicates the ceramic sintered body.

DETAILED DESCRIPTION OF THE INVENTION

According to the present invention, safety is ensured because the pressure for impregnating the porous ceramic body with metal is applied by using a widely employed mold press method so that a pressure as high as 1000 – 3000 kg/cm$^2$ can be easily applied. Moreover, mass production is possible just as in the case of conventional compressiom-molded metal products. Since the pressure applied for impregnation is about 10 to 30 times as high as in the conventional autoclave process, a high rate of metal impregnation is easily obtained and the performance of the product is accordingly excellent.

The manufacturing process according to our invention has the following advantages:

1. As compared with the conventional autoclave process, an extremely high impregnating pressure is easily available and therefore impregnation can be effected under high pressure. The metal-impregnated ceramic thus produced has a very high rate of metal impregnation, and accordingly it exhibits a high flexural strength.

2. The process is easier to carry out than the autoclave process; suited to mass production; and less hazardous.

3. The autoclave process can impregnate a ceramic article with a metal of high melting point, only under limited conditions, but the process according to the invention permits easy impregnation with a metal having a considerably high melting point.

4. If impregnation is carried out at the same temperature under the same pressure, impregnation of a ceramic article with metal by the process according to the invention costs less for installation.

Figure 1:
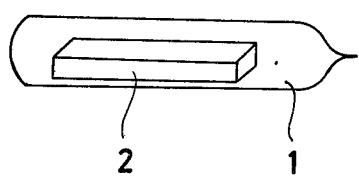

The impregnation of a ceramic article with metal according to the present invention takes place as follows:

The sintered ceramic body 2 is placed in a glass vessel 1, as shown in FIG. 1. This glass vessel is sealed after being evacuated, whereby a capsule (FIG. 1) comprising said sintered ceramic body held in an evacuated glass vessel is obtained. The capsule is submerged in a molten metal and held there for several minutes until the temperature of the sintered ceramic body in the capsule becomes nearly equal to that of the molten metal. Then the capsule and molten metal are placed in a mold and pressure is applied to break the capsule, thereby impregnating said ceramic sintered body with metal. The ceramic sintered body thus impregnated with metal becomes enveloped with metal as soon as the metal solidifies. Therefore the metal is melted by reheating, and the metal-impregnated ceramic and the broken pieces of said capsule are separated from the molten metal by means of a filter.

The following examples illustrate the details of the present invention.

EXAMPLE 1

A sintered silicon nitride ($Si_3N_4$) bar having a porosity of 23.0% (measuring 10 × 10 × 100mm) was sealed up in an evacuated glass capsule with a vacuum degree of about $1 \times 10^{-2}$ mmHg.

The capsule was submerged in a 750°C pool of molten aluminum alloy (JIS-AC8A), which was being stirred, and held there for 5 minutes. Then the molten pool holding the capsule was cast in a mold, to which a pressure of 2000 kg/cm$^2$ was applied to break the capsule, thereby yielding an aluminum alloy-enveloped silicon nitride mass impregnated with said aluminum alloy. The mass was remelted; and using an alumina filter, the broken pieces of capsule and the aluminum alloyimpregnated silicon nitride were separated from the molten pool of aluminum alloy, thereby producing an aluminum alloy-impregnated body of sintered silicon nitride, its degree of metal impregnation being 99.5%, that is to say, 99.5% of the volume of the pores in the body were filled.

EXAMPLE 2

Under the same conditions as in Example 1, a stick of graphite having a porosity of 18.3% (measuring 10 × 10 × 100 mm) was impregnated with aluminum alloy. The rate of metal impregnation in the metal-impregnated graphite thus obtained was 98.7%.

EXAMPLE 3

Under the same conditions as in Example 1, sintered alumina with porosity of 22.9% (measuring 10 × 10 ×

100mm) was impregnated with aluminum alloy. The rate of metal impregnation in the metal-impregnated alumina thus obtained was 99.0%.

EXAMPLE 4

In the same way as in Example 1, five sticks of sintered silicon nitride with respective porosities of 19.3, 19.7, 20.1, 20.5 and 20.9% (each measuring 10 × 10 × 100mm) were respectively sealed up in an evacuated glass capsule.

Each capsule was submerged in a 750°C molten pool of aluminum alloy (JIS-AC8A) which was being stirred, and held there for 5 minutes. Thereafter each capsule, together with the molten metal, was cast in a mold and subjected to pressures of 100, 500, 1000, 2000 and 3000 kg/cm² for metal impregnation. Next, in the same way as in Example 1, the resulting mass was remelted to separate the metal-impregnated body of sintered silicon nitride. The rate of metal impregnation in each product obtained was measured.

Figure 2:
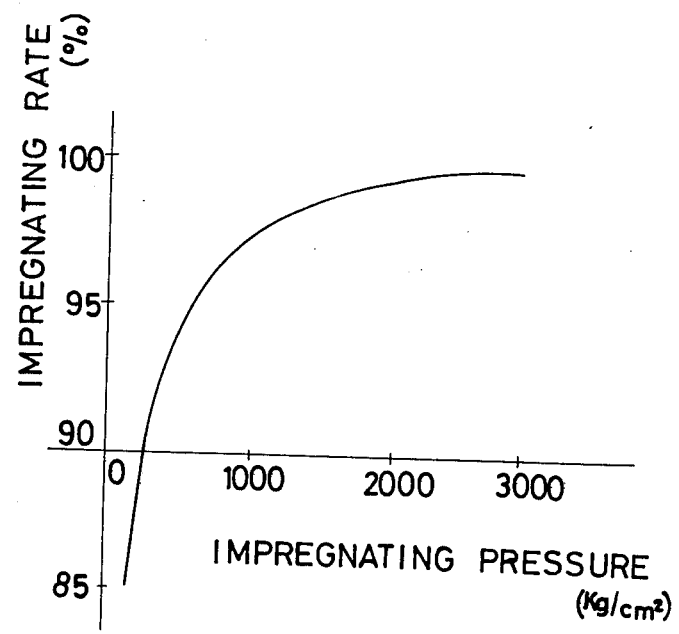

FIG. 2 illustrates the relationship between the applied pressure and the rate of metal impregnation, from which it is seen how said rate of metal impregnation increases with an increase in the applied pressure.

EXAMPLE 5

Instead of the aluminum alloy in Example 1, a magnesium alloy (Mg—5%Al—1%Zn) was employed and sintered silicon nitride with porosity of 25.3% was impregnated with a 750°C molten magnesium alloy. The rate of metal impregnation in the product was 99.3%.

EXAMPLE 6

Instead of the aluminum alloy in Example 1, a silver alloy (Ag—5%Cu) was employed and sintered silicon nitride with porosity 23.4% was impregnated therewith.

The temperature of the molten metal was 1050°C. The rate of metal impregnation in the metal-impregnated body of sintered silicon nitride was 98.7%.

The impregnating pressure, the porosity, the rate of impregnation and the flexural strength of silicon nitride impregnated with an aluminum alloy (JIS-AC8A) according to the present invention and according to the conventional process are compared in the following table, which shows that the product according to the present invention exhibits a considerably higher flexural strength. The flexural strength was measured in the following manner: A test piece of width 10mm, thickness 6mm, length 35mm is placed on two supports spaced 30mm apart, and a blade having a radius of curvature of 1mm at its tip, is applied at a rate of loading of 0.5mm/min to said test piece at a midway point between said two supports until said test piece breaks.

|  | Pressure (Kg/cm²) | Porosity (Percentage of pore space to total volume) | Percentage of pore space impregnated | flexural strength (Kg/cm²) |
| --- | --- | --- | --- | --- |
| Present invention | 100 | 19.3 | 83.8 | 1340 |
|  | 500 | 19.7 | 96.5 | 1700 |
|  | 1000 | 20.1 | 97.4 | 2035 |
|  | 2000 | 20.9 | 99.4 | 2550 |
| Autoclave process | 50 | 19.0 | 71.3 | 1220 |
|  | 70 | 19.4 | 78.5 | 1307 |
|  | 90 | 19.5 | 80.3 | 1430 |
|  | 120 | 20.4 | 84.2 | 1451 |

EXAMPLE 7

In the same way as in Example 1, sintered silicon nitride having a porosity of 21.5% (measuring 10 × 10 × 80 mm) was sealed up in an evacuated capsule. Said capsule was heated to 800°C, introduced into a mold, into which a molten aluminum alloy was poured; and then by applying a pressure of 2000 kg/cm², said capsule was broken. After separation, a metal-impregnated body of sintered silicon nitride was obtained. The rate of metal impregnation in the product was 97.3% and its flexural strength was 2130 kg/cm².

EXAMPLE 8

In the same way as in Example 1, sintered silicon nitride having a porosity of 19.6% (measuring 10 × 10 × 80 cm) was sealed up in an evacuated capsule. The capsule was heated in a 750°C electric furnace, submerged in a molten pool of aluminum alloy, and broken by various mechanical means. The aluminum alloy containing the broken pieces of said capsule and silicon nitride was introduced into a metal mold. After applying a pressure of 2000 kg/cm² thereto, it was treated in the same way as in Example 1, thereby yielding an aluminum-impregnated silicon nitride. The percentage of metal impregnation thereof was 97.9% and the flexural strength was 2400 kg/cm².

What is claimed is:

1. Method of impregnating a porous sintered ceramic material with metal, which method comprises the steps of sealing said material in an evacuated glass capsule, submerging said capsule in a molten metal, and breaking said capsule while applying pressure to said metal and capsule to impregnate said sintered ceramic material with said metal.

2. Method claimed in claim 1, wherein the evacuated capsule within which said sintered ceramic material is sealed is heated within said metal until the temperature of said capsule becomes nearly equal to that of the molten metal; the molten metal holding said capsule is then introduced into a mold; and pressure is applied to said mold until said capsule is broken, thereby impregnating said sintered ceramic with metal.

3. Method as claimed in claim 1, wherein the evacuated capsule containing said sintered ceramic is heated and introduced into a mold; a molten metal is poured into said mold; and pressure is applied until said capsule is broken thereby impregnating said sintered ceramic with metal.

4. Method as claimed in claim 1, wherein the evacuated capsule in which the sintered ceramic is sealed up is submerged in a molten metal; said capsule is broken in said metal by mechanical means after the temperature of said capsule becomes nearly equal to the temperature of molten metal; the molten metal holding said sintered ceramic is introduced into a mold; and said sintered ceramic is impregnated with metal by applying pressure to said mold.

5. Method as claimed in claim 1, wherein the ceramic material is selected from the group consisting of sintered silicon nitride ($Si_3N_4$), sintered alumina and graphite.

6. Method as claimed in claim 1 wherein the said metal is selected from the group consisting of aluminum alloys, magnesium alloys and silver alloys.

* * * * *